(12) United States Patent
Inoue et al.

(10) Patent No.: US 6,438,319 B1
(45) Date of Patent: Aug. 20, 2002

(54) RECORDING DIGITAL VIDEO SIGNALS AND REDUNDANCY SIGNALS FOR ERROR CORRECTION

(75) Inventors: Hajime Inoue, San Jose, CA (US); Naofumi Yanagihara, Tokyo (JP)

(73) Assignee: Sony Electronics Inc., San Diego, CA (US)

( * ) Notice: Subject to any disclaimer, the term of this patent is extended or adjusted under 35 U.S.C. 154(b) by 1364 days.

(21) Appl. No.: 08/813,140

(22) Filed: Mar. 7, 1997

Related U.S. Application Data

(63) Continuation of application No. 08/461,440, filed on Jun. 5, 1995, now abandoned.

(51) Int. Cl.$^7$ ................................................. H04N 7/64
(52) U.S. Cl. ........................................ 386/116; 386/124
(58) Field of Search ........................... 386/21, 40, 113, 386/116, 124; 360/32, 48; H04N 7/64

(56) References Cited

U.S. PATENT DOCUMENTS

| | | | | |
|---|---|---|---|---|
| 4,455,655 A | | 6/1984 | Galen ........................ 371/38 |
| 4,564,945 A | * | 1/1986 | Glover et al. ............... 358/336 |
| 4,829,387 A | | 5/1989 | Kato ........................... 360/32 |
| 4,872,066 A | * | 10/1989 | Yamagata et al. .......... 358/336 |
| 4,956,768 A | | 9/1990 | Sidi et al. ................... 364/200 |
| 4,963,995 A | * | 10/1990 | Lang ........................... 358/335 |
| 5,003,541 A | * | 3/1991 | Mester ........................ 358/336 |
| 5,105,282 A | * | 4/1992 | Taguchi ....................... 358/336 |
| 5,130,861 A | * | 7/1992 | Suma ........................... 360/32 |
| 5,146,370 A | | 9/1992 | Endo et al. .................. 360/32 |
| 5,237,465 A | * | 8/1993 | Sekiguchi .................... 360/51 |
| 5,245,430 A | * | 9/1993 | Nishimura ................... 358/336 |
| 5,247,363 A | * | 9/1993 | Sun et al. .................... 358/336 |
| 5,343,455 A | * | 8/1994 | Takeuchi et al. ............. 360/48 |
| 5,377,051 A | * | 12/1994 | Lane et al. .................. 360/33.1 |
| 5,432,613 A | * | 7/1995 | Lee ............................ 358/335 |
| 5,457,580 A | * | 10/1995 | Yoo ........................... 360/36.2 |

FOREIGN PATENT DOCUMENTS

| | | |
|---|---|---|
| EP | 411 835 A2 | 2/1991 |
| EP | 553 515 A2 | 8/1993 |
| EP | 590 881 A2 | 4/1994 |
| GB | 2 259 379 | 3/1993 |

* cited by examiner

*Primary Examiner*—Young Lee
(74) *Attorney, Agent, or Firm*—Wood, Herron & Evans, L.L.P.

(57) ABSTRACT

A digital video recorder or player performing error correction coding and decoding in a two separate or paged memories. During a first phase of operation, previously error-corrected or error-encoded data is read from a first memory while simultaneously new data to be error-encoded or error-corrected is stored in the first memory. Meanwhile, the second memory is used for error-encoding or error-decoding of previously-stored data. In the second phase, the memories reverse roles; the data stored in the first memory is error-encoded or error-corrected while previously error-corrected or error-encoded data is read from the second memory and replaced with new data to be error-encoded or error-corrected. These phases are performed in an alternating fashion throughout a record or playback operation.

46 Claims, 8 Drawing Sheets

FIG. 10

| PROCESS | MEMORY | 5 DRUM ROTATIONS | 5 DRUM ROTATIONS | 5 DRUM ROTATIONS |
|---|---|---|---|---|
| MAXIMUM SPEED PLAYBACK 270 | 156 | STORE DATA FROM HEADS RETRIEVE CORRECTED DATA FOR OUTPUT | CORRECT ECC START RETRIEVING | STORE DATA FROM HEADS RETRIEVE CORRECTED DATA FOR OUTPUT |
| | 158 | CORRECT ECC START RETRIEVING | STORE DATA FROM HEADS RETRIEVE CORRECTED DATA FOR OUTPUT | CORRECT ECC START RETRIEVING |
| MAXIMUM SPEED RECORD 260 | 156 | STORE DATA FROM INCOMING TRANSMISSION, RETRIEVE ENCODED DATA FOR HEADS | ENCODE ECC START RETRIEVING | STORE DATA FROM INCOMING TRANSMISSION, RETRIEVE ENCODED DATA FOR HEADS |
| | 158 | ENCODE ECC START RETRIEVING | STORE DATA FROM INCOMING TRANSMISSION, RETRIEVE ENCODED DATA FOR HEADS | ENCODE ECC START RETRIEVING |
| 1/2 SPEED RECORD 280 | 156 | STORE DATA FROM INCOMING TRANSMISSION RETRIEVE ENCODED DATA FOR HEADS | | |
| | 158 | ENCODE ECC START RETRIEVING | | |
| 1/3 SPEED RECORD 300 | 156 | STORE DATA FROM INCOMING TRANSMISSION RETRIEVE ENCODED DATA FOR ALTERNATING HEADS | | ENCODE ECC START RETRIEVING |
| | 158 | ENCODE ECC START RETRIEVING | | STORE DATA ...RETRIEVE... DATA FOR ALTERNATING HEADS |
| 1/4 SPEED RECORD 310 | 156 | STORE DATA FROM INCOMING TRANSMISSION RETRIEVE ENCODED DATA FOR HEADS EVERY OTHER DRUM ROTATION | | |
| | 158 | ENCODE ECC START RETRIEVING | | |
| 1/2 SPEED PLAYBACK 290 | 156 | STORE DATA FROM HEADS RETRIEVE CORRECTED DATA FOR OUTPUT | | STORE DATA FROM HEADS RETRIEVE CORRECTED DATA FOR OUTPUT |
| | 158 | ENCODE ECC START RETRIEVING | | ENCODE ECC START RETRIEVING |
| 1/2 SPEED COMPRESSED PLAYBACK 320 | 156 | RECONSTRUCT EACH TRACK FROM HEADS RETRIEVE CORRECTED DATA FOR OUTPUT | | RECONSTRUCT EACH TRACK FROM HEADS RETRIEVE CORRECTED DATA FOR OUTPUT |
| | 158 | ENCODE ECC START RETRIEVING | | |

RECORDING DIGITAL VIDEO SIGNALS AND REDUNDANCY SIGNALS FOR ERROR CORRECTION

This application is a continuation of application Ser. No. 08/461,440 filed on Jun. 5, 1995, entitled RECORDING DIGITAL VIDEO SIGNALS, abandoned.

CROSS REFERENCE TO RELATED APPLICATIONS

This application is related to the following previously-filed U.S. patent applications: Ser. No. 08/248,176, filed May 24, 1994, Ser. No. 08/253,283, filed Jun. 2, 1994, Ser. No. 08/327,370, filed Oct. 21, 1994, and Ser. No. 08/358,880, filed Dec. 19, 1994, all assigned to the same assignee as the present application and all of which are incorporated herein by reference.

RELATED APPLICATION

1. Field of the Invention

This invention relates to recording and playback of digital video signals.

2. Background of the Invention

Television signals have traditionally been transmitted and recorded in analog form, but more recently digital transmission and recording have been introduced. Digital video cassette recorders (VCRs) have been introduced to the market, and digital broadcast of television signals has been introduced to the U.S. in the form of direct satellite-to-home digital television systems.

Digital broadcast of television signals has permitted the introduction of advanced digital signal compression and encoding techniques, reducing the bandwidth of television signals without loss of picture quality. These techniques include the Moving Picture Expert Group (MPEG) transmission standard, ISO/IEC 13818-1, in which the video signal includes so-called I-frames, which have a large quantity of data representing a complete still image, and sequences of so-called P-frames and B-frames, which have a smaller amount of data representing incremental modifications of the still image which produce motion. I-frames are transmitted at a low rate interspersed with a number of P-frames and B-frames.

SUMMARY OF THE INVENTION

It has been proposed, in the above-referenced related U.S. Patent Applications, to record digital television broadcast signals using a digital VCR, to thereby maintain fidelity of the broadcast signal during recording and subsequent playback.

This use of the digital VCR raises difficulties arising from the data compression techniques often applied to digital broadcast signals. These digital data compression techniques typically involve variable-length encoding in which each data value is generated as a function of possibly several prior data values, and thus an error in reproduction of a given data value can produce a lengthy string of consecutive data errors.

To prevent such lengthy strings of errors from impacting reproduction quality, it has been proposed in above-referenced application Ser. No. 08/358,880 to include three levels of redundancy, or parity, encoding into the data recorded by the digital VCR. The first, second and third levels of parity encode increasingly larger segments of data, such that the third, highest level of parity encodes roughly 100 kilobytes of data. The very large amount of data encoded by the third level of parity provides protection from lengthy data errors of the kind that may be produced by run-length encoding such as is typically used in digital video signals.

The use of multiple levels of parity makes it difficult to encode and decode data, since very large quantities of data must be handled and manipulated in a relatively short period of time during both recording and playback. Moreover, since digital memory is relatively expensive, it is important to perform the encoding and decoding operations using a small amount of digital memory.

The present invention provides a method for managing parity encoding and decoding in a manner which provides efficient use of digital memory, and further provides a digital video recorder and/or player which utilizes this method.

specifically, in accordance with principles of the present invention, recording is a two-phase operation. In a first phase, a first portion of a digital memory is used to output error-encoded data and to store new digital data from the signal source. After an error-encoded digital signal in the first portion of the memory has been forwarded to the recording head, digital signals from the signal source are stored in its place in the first portion of the digital memory. At the same time, during the first phase, error correcting circuitry error encodes digital signals stored in a second portion of the digital memory. In the second phase of the recording operation, the roles of the memory portions are reversed: error-encoded digital signals in the second portion of the memory are forwarded to the recording head, and digital signals from the signal source are stored in place of these error-encoded digital signals in the second portion of the digital memory. At the same time, the error correcting circuitry error encodes digital signals previously stored in the first portion of the digital memory.

Playback is also a two-phase operation. In the first playback phase, a first portion of a digital memory is used to output error-decoded data to a destination such as a television, and to store new digital data from the playback head. After an error-decoded digital signal in the first portion of the memory has been forwarded to the destination, digital signals from the playback head are stored in its place in the first portion of the digital memory. At the same time, during the first phase, error correcting circuitry error decodes digital signals stored in a second portion of the digital memory. In the second phase of the recording operation, the roles of the memory portions are reversed: error-decoded digital signals in the second portion of the memory are forwarded to the destination, and digital signals from the signal source are stored in place of these error-decoded digital signals in the second portion of the digital memory. At the same time, the error correcting circuitry error decodes digital signals previously stored in the first portion of the digital memory.

The two memories used in the above-noted phases may be implemented as separate integrated circuits, or may be paged into a single integrated circuit memory chip.

Apparatus in accordance with the invention may include either or both of the record and playback functions described above, and the specific embodiment of the invention described below performs both functions.

In this specific embodiment, in both record and playback modes, there is a transition period between the two phases described above; this transition period occurs after completion of most or all of the error-encoding or error-correcting, and before the memories switch roles and error-encoding or error-correcting begins in a new memory. For example, during the transition period between the first and second phases of a playback operation, error-corrected digital signals in the second memory, which are the result of the recently-completed error correcting operation, are read from the second memory and sent to the signal destination; at the same time, digital signals from the playback head continue to be written into the first memory. This transitional period continues until the second memory is full, at which point the second phase, as described above, begins. As a second example, during the transition period from the first to the second phase of a record operation, error-encoded digital signals are read from the second memory and sent to the record head while digital signals from the signal source are still being written into the first memory.

In the specific embodiment discussed below, recording and playback are performed by a video tape system using a rotating drum. In other embodiments, the recording and playback may be performed by a video disk rotating under a radially-positioned head, or by any other suitable digital recording media. The video tape system described below permits variable-speed reproduction of previously recorded data, by reconstructing tracks of data on the video tape from multiple passes of the playback head.

Furthermore, in the specific embodiment discussed below, the encoded signal uses a compressed format such as the MPEG format discussed above. A packet detector for identifies those MPEG frames including complete still images, so that these still images may be used to generate trick play data that can be recorded along with the MPEG data to permit special effect playback functions. This trick play data is reconstructed upon playback and used in special effects playback modes. To do so, the playback apparatus includes an encoder for forming MPEG-compatible packets from the trick play data, which can be forwarded for display while in a special effects playback mode.

The above and other features and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 10 is a chart illustrating the timing of operations in the memories 156 and 158 illustrated in FIG. 4 under various operating conditions.

DETAILED DESCRIPTION OF SPECIFIC EMBODIMENTS

Figure 1:
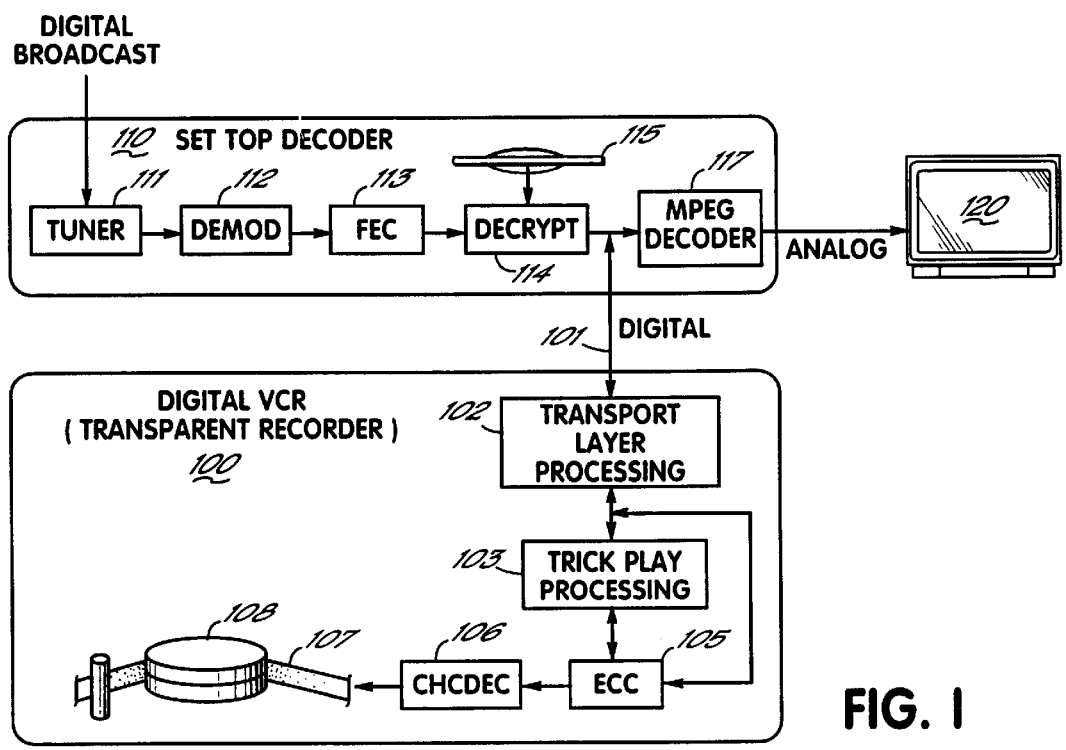
FIG. 1 is an overall block diagram of a digital VCR in accordance with principles of the present invention, used in conjunction with a set-top MPEG broadcast decoder.

Referring to FIG. 1, a digital VCR 100 in accordance with the principles of the present invention may be used advantageously in connection with a set top decoder 110 for receiving and decoding a digital broadcast signal. Decoder 110 includes a tuner 111 for receiving a digital broadcast signal from an antenna (not shown). The tuned digital broadcast signal is demodulated by demodulator 112 in supplied to a forward error correction unit 113. Forward error correction unit 113 removes broadcast errors and reception errors from the digital broadcast signal and supplies an error corrected signal to decryptor 114. Decryptor 114 reads authorization information from the owner's smart card 115 to determine which program channels can be accessed by the owner. These program channels are made available to a MPEG decoder 117 which decodes the MPEG encoding of the digital broadcast signal to produce an analog output for display on a television 120.

Digital VCR 100 receives and supplies data to MPEG decoder 117 of set top decoder 110 via digital signal communication lines 101. The digital signal received on lines 101 is processed by a transport layer processing section 102 which performs encoding and processing of the digital broadcast signal, as discussed below. Further encoding and processing is performed by a trick play processing unit 103, as discussed below. Processed digital data is error correction encoded by section 105 in a manner discussed below, is channel encoded for recording by section 106, and then is recorded on a video tape 107 via a magnetic head on a rotating drum 108. Data which is retrieved from magnetic tape 107 by the head on drum 108 is decoded by sections 106 and 105 of the digital VCR and then returned on digital lines 101 as a MPEG coded signal which may be decoded by MPEG decoder 117 and supplied as an analog signal to TV 120.

Figure 2A:
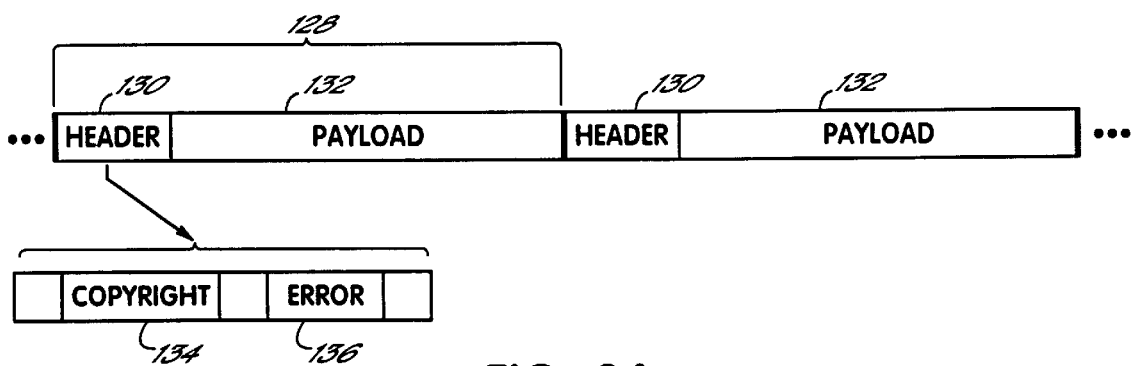
FIGS. 2A and 2B are illustrations of the MPEG broadcast format discussed above.

Referring to FIG. 2A, the MPEG encoded signal carried by the digital broadcast and received and transmitted on lines 101 of FIG. 1 has a format including a sequence of packets 128, each having a header 130 and a payload 132. Each header 130 is followed by a payload section 132 including digital data that is being transmitted. The payload sections include digitally encoded video information, as well as digitally encoded audio, and digitally encoded program and control information. The header section associated with each payload includes, among other fields, a copyright field including digital signals indicating whether the digital information in the following payload may be duplicated by the recipient and the manner in which it may be duplicated. In addition, the header includes an error field 136 containing digital signals indicating various error conditions under which the digital information in the payload 132 associated with the header may be faulty.

Figure 2B:
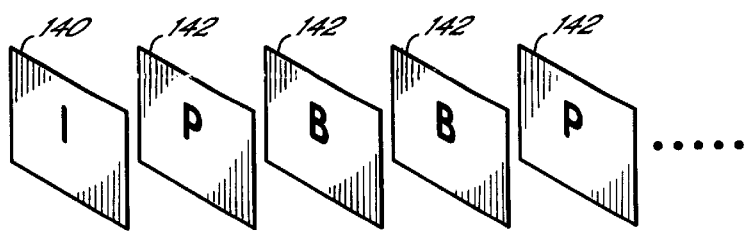

Referring to FIG. 2B, the video information stored in the payload sections of the MPEG encoded brackets 128 includes, as noted above, a sequence of I-frames 140, each of which includes a large quantity of digital data describing a complete still image, and sequences of P-frames and B-frames 142, each indicating modifications which when performed on the still image data in an I-frame, will recreate motion of the image. The I-frames and P-and B-frames illustrated in FIG. 2B may be encoded in a single payload section of the MPEG signal or may be encoded in several payload sections, depending upon the resolution of the image, the size of the frame being transmitted, and the size of payload format in use.

Figure 3:
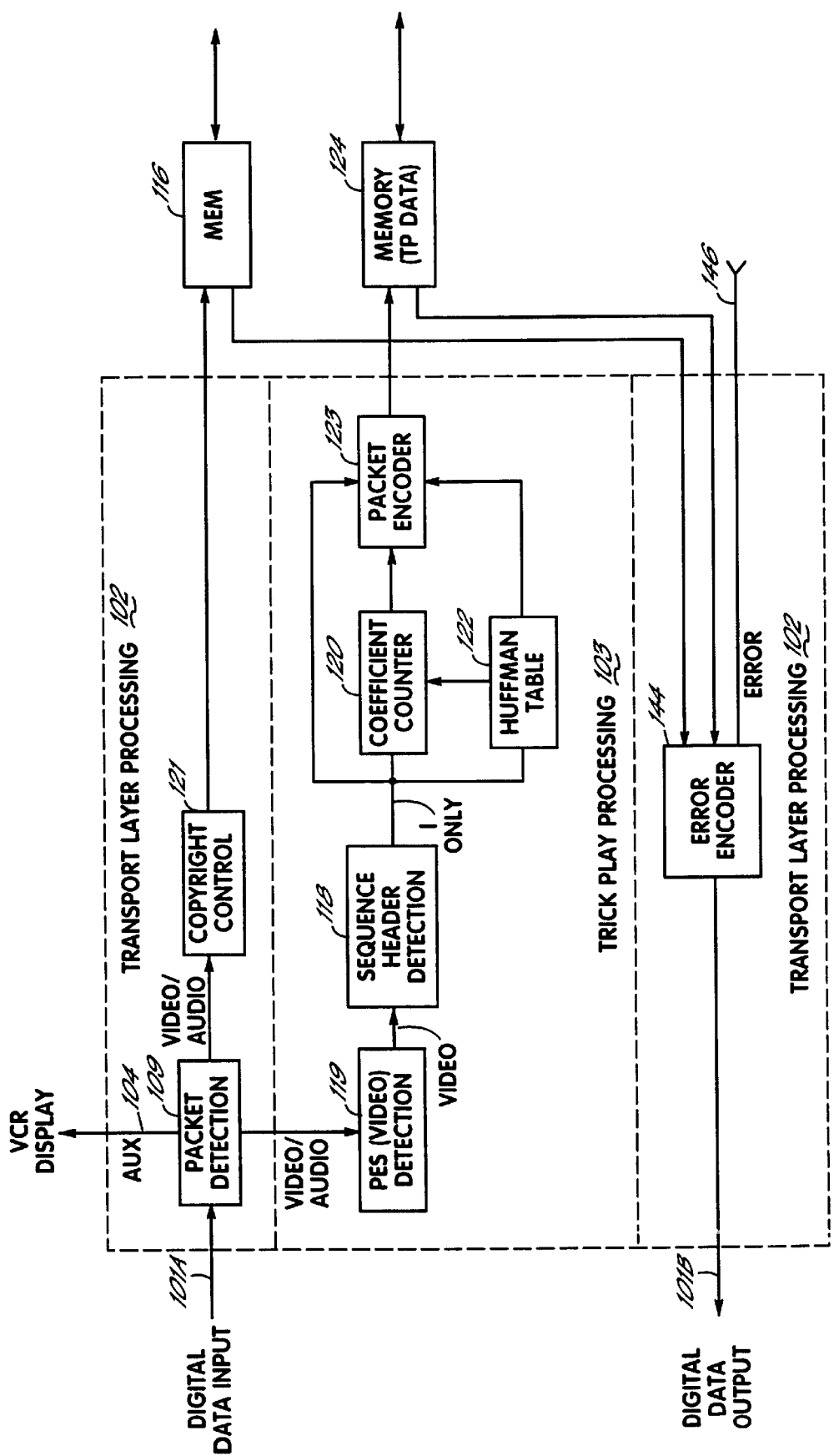
FIG. 3 is a block diagram of the front-end transport layer and trick play processing of the digital VCR of FIG. 1.

Referring to FIG. 3, the digital VCR includes, at its front end, transport layer processing circuitry 102 and trick play processing circuitry 103. These sections of the digital VCR interact to prepare MPEG encoded data for recording by the VCR.

Digital data received by the digital VCR on line 101a is first processed by a packet detection circuit 109 which is configured to identify the packets 128 in the MPEG encoded signal on line 101a and separate those packets including video and audio information from packets containing control information and other broadcast information. Video and audio packets are forwarded by packet detection circuit 109 to picture elementary stream (PES) circuit 119 and copyright control circuit 121. Other packets, which contain auxiliary broadcast information such as program guide information and subscriber authorization data, is output on line 104 to the CPU of the digital VCR for processing. In this way, the VCR may utilize and/or display any programming information or other data in the MPEG encoded signal.

Copyright control circuit 121 processes the packets containing video and audio data received from packet detector 109 to evaluate the copyright field 134 in the header 130 of each packet. Copyright control circuit 121 provides control over the copying of data by users of the digital VCR in accordance with the data in the copyright field 134 of the packets 128. Thus, for example, if copyright field 134 indicates that the packet 128 associated with the copyright field is not to be copied, copyright control circuit 121 will signal the CPU of the digital VCR to prevent duplication of the packet 128. Alternatively, if the copyright field 134 indicates that the contents of the associated packet 128 are only to be duplicated once, copyright control circuit 121 will modify the contents of the copyright field 134 such that the copyright field indicates that there is to be no further copying of the contents of the packet 128. As a result, when the digital VCR plays back the recorded packet 128, if the played back data is input to a second digital VCR having a copyright control circuit, the receiving digital VCR will prevent further copying of the packet 128. As another alternative, copyright field 134 may identify a number of generations of copies that are permitted, in which case copyright control circuit 121 reduces the number of generations that may be copied by one before forwarding the packet 128 for recording by the digital VCR. Finally, copyright field 134 may indicate that any amount of copying is authorized, in which case, copyright control circuit 121 forwards the packet 128 unmodified.

Packets 128 forwarded by copyright control circuit 121 are delivered to a buffer memory 116 where they are buffered until ready for further processing, as discussed below in connection with FIG. 4.

Packet detection circuit 109 also forwards video and audio information to PES detection circuit 119. PES detection circuit 119 identifies video packets and separates the video packets from audio packets. Video packets are forwarded to sequence header detection circuit 118, whereas audio packets are discarded.

Sequence header detection circuit 118 locates those video packets which describe I-frames 140 (FIG. 2B). I-frame data 140 is forwarded to a coefficient counter 120 and a Huffman table 122 for compression of the I-frame data to form compressed images representative of the complete video signal in the MPEG encoded data on line 101a. Coefficient counter 120 and Huffman table 122 compress the I-frame data by eliminating high frequency components from the video signal. The result is a relatively small quantity of digital data which can be used to effectively represent the complete images received on line 101 during special effects modes of the digital VCR. These compressed representations are converted into MPEG packets by a packet encoder 123 (so that they have the same form as an MPEG broadcast) and are stored in a memory 124 for combination with the complete video signal as discussed below with reference to FIG. 4.

The compressed trick play data is generated so that the digital VCR may provide forward and rearward scan functions, in which the digital VCR can produce a rapid sequence of images representative of a complete video information in the MPEG encoded data on line 110a. Further details on the manner in which trick play is encoded and stored on video tape by the digital VCR, and then later retrieved, can be found in the above-referenced U.S. patent. application Ser. Nos. 08/248,176 and 08/327,370.

As discussed in further detail below, during playback by the VCR, MPEG packets which have been previously stored by a digital VCR, are read from the video tape and stored in memories 116 and 124 for output by the digital VCR. These MPEG packets are retrieved from memory 116 or memory 124 by an error encoder circuit 144. Error encoder 144 is also responsive to an error signal on line 146, which indicates whether an uncorrectable error has occurred during reproduction of the MPEG packets in memory 116. If no uncorrectable errors have occurred, error encoder 144 passes the MPEG packets directly to digital data output line 101b for decoding by MPEG decoder 117 in the set top decoder 110, and display on TV 120 (FIG. 1). If, however, an uncorrectable error has occurred during reproduction of the MPEG signal by the digital VCR, error encoder 144 responds to a signal on line 146, and modifies the error field 136 in the header 130 of each packet 128 received from memory 116 or memory 124. Error encoder 144 changes the error field 136 to include values indicative of a transmission error. The MPEG packets are then forwarded as before to the digital data output on line 101b and decoded by MPEG decoder 117 of FIG. 1. Thus, if there is an error in reproduction of the video image, an indication of this error is forwarded to the set top decoder 110 which can take the appropriate action in response to the error.

As noted above, the digital VCR supports normal playback of MPEG data, as well as forward and reverse scan special effects play modes. During normal playback, complete MPEG data is supplied to memory 116 and is read by error encoder 144, whereas during special effects playback, MPEG-encoded trick play data is supplied to memory 124 and read by error encoder 144. Thus, during special effects playback, trick play data is used for display on the TV 120, so that the operator of the digital VCR may see images representative of the complete MPEG encoded data on the video tape during forward and reverse scan operations.

Figure 4:
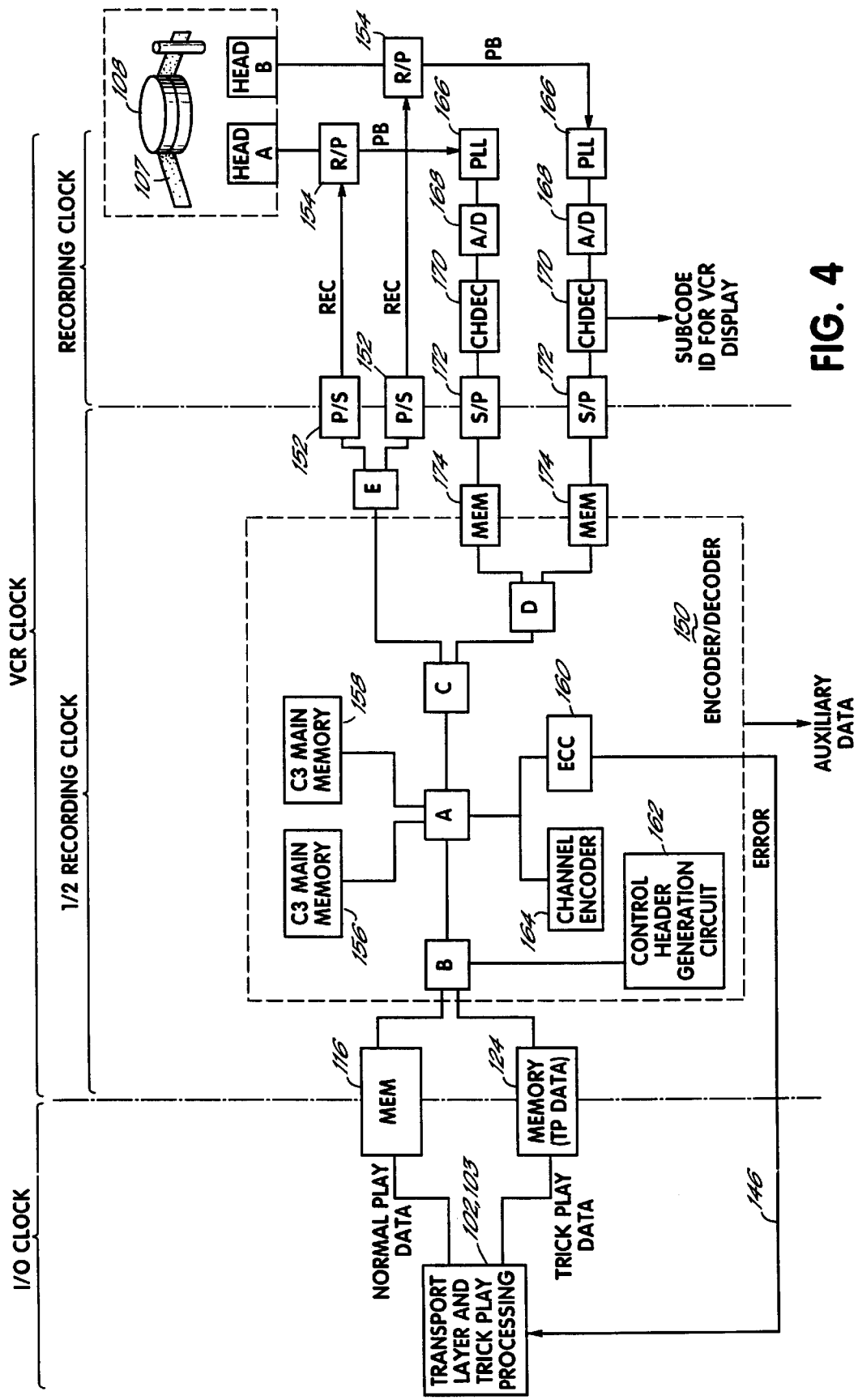
FIG. 4 is a block diagram of the error and channel encoding and decoding sections of the digital VCR of FIG. 1.

Referring to FIG. 4, after MPEG encoded data has been received and processed by the transport layer and trick play processing 102, 103, the resulting information is processed through error correction and channel encoding and ultimately recorded on a video tape 107 by a head or heads on a rotating drum 108. As noted above, MPEG data is stored in a memories 116 and 124 for retrieval and error correction coding. Error correction coding and channel encoding is performed by an encoder/decoder circuit 150. After error correction coding by encoder/decoder circuit 150, data is forwarded to parallel to serial converters 152, and through read/playback amplifiers 154 for recording on the heads on drum 108.

Encoder/decoder circuit 150 includes a number of functional units for performing error correction encoding, channel encoding, error correction decoding and channel decoding. Specifically, data from memories 116 and 124 is transferred to one of two main memories 156 and 158. Each memory 156, 158 has a size of approximately 150 kbytes. Error correction circuit 160 operates on data stored in memories 156, 158 to encode this data using a three-level Reed-Solomon error correction scheme, and error-correct the data using this scheme. (Circuit 160 generates the error signal on line 146 which is received by error encoder 144 (FIG. 3)). A control header generation circuit 162 enhances the error correction coded data to include a control header for storage on video tape 107. Finally, the channel encoder 164 encodes the data in memories 156 and 158 in a suitable error preventing channel encoding scheme, such as Viterbi encoding. After being thus encoded, information stored in memories 156 and 158 is forwarded to parallel to serial converters 152, through amplifiers 154 and to the heads for recording on video tape 107.

During playback, channel encoded data from video tape 107 is received by heads A and B and routed through amplifiers 154 to phase lock circuits 166. Circuits 166 produce analog voltages which are digitized by analog to digital converters 168. These digitized signals are then decoded from the channel encoding by channel decoders 170. The decoded information is converted to parallel form by serial to parallel conversion circuits 172. The data produced by circuits 172 is stored in memories 174.

As discussed below, memories 174 are used to combine potentially multiple batches of data read from a single track on video tape 107, to compile a complete track. The data from memories 174 is then transferred to main memories 156 and 158 for error-correction, and then forwarded to memories 116 and 124 for output. This operation of combining multiple batches of data from a single track may also be performed in main memories 156 and 158 if there is sufficient processing speed to do so and also perform the other operations discussed below. If there is not enough speed to perform these operations in main memories 156 and 158, then these operations are performed in memories 174.

A control circuit (not shown) interacts with bus transceivers A, B, C, D and E to manage flow of data between memories 156 and 158 in the other circuitry discussed above. The details of the operations performed in main memories 156 and 158, using the other circuitry discussed above, are elaborated below with reference to FIGS. 6A–7E.

Figure 5:
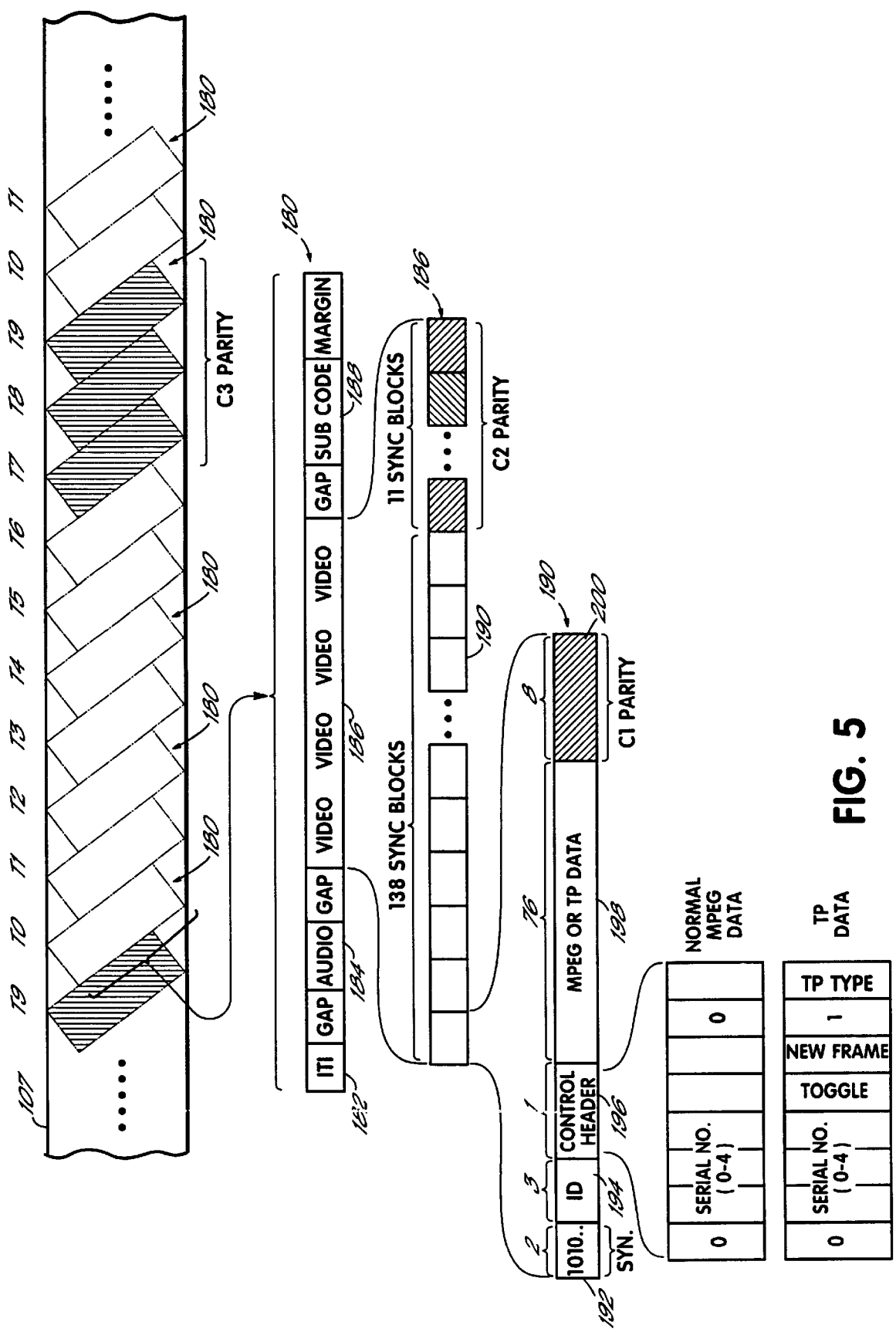
FIG. 5 is an illustration of the data format recorded on the video tape by the digital VCR of FIG. 1.

Referring to FIG. 5, video tape 107 stores digital data in tracks 180 which are recorded on video tape 107 by heads on rotating drum 108. The rotation of the drum relative to tape 107 creates tracks 180 which are written sequentially across the width of tape 107, typically at an angle, as diagrammatically represented in FIG. 5. As noted above, the digital data recorded on video tape 107 is encoded using three separate levels of parity encoding. The highest level of parity encoding, known as $C_3$, encodes large blocks of digital data in order to enhance the protection against errors, which is particularly important when the recorded data is run-length encoded (as is used in MPEG digital video), since in run-length encoding a single error can adversely affect a large amount of data. $C_3$ parity bits are stored as separate tracks along with the encoded digital video data on tape 107. Thus, within each group of 10 tracks, seven tracks T0, T1 ... T5, T6, store digital video information, whereas the last three tracks, T7, T8 and T9 store $C_3$ parity information. As illustrated in FIG. 5, as a result, $C_3$ parity information is interleaved with digital video information on video tape 107.

Those tracks 180 which contain digital video information have a format illustrated in greater detail in FIG. 5. Specifically, this format includes an ITI area 182 which is used to provide frequency synchronized signals to permit insert editing and also permit a player to obtain track structure information from the video tape 107. Following the ITI 182 is an audio area 184, which can be used to store digital audio information associated with the video signal in the track 180. Area 186 is used to store video or MPEG audio/video information. Finally, area 188 is used to store subcode information, i.e. information indicating the track number of the current track so that the digital VCR may display time coding and/or permit the user to queue the video tape to a specific time location, or to search for a specific time location.

In the embodiment of the invention illustrated in FIG. 1, the video area 186 is used to store all of the MPEG encoded data stored by the digital VCR. This MPEG encoded data includes both video and audio information, as noted above in FIG. 2A. As a result, audio area 184 is not needed to store the audio information in the MPEG transmission. As a result, audio area 184 can be used to store a secondary audio track, for example, an audio track created by overdubbing the original audio track. Alternatively, audio area 184 may be used to store other information of interest relating to the MPEG transmission stored in video area 186.

The video area 186 of each track 180 is formatted as a sequence of 149 sync blocks 190. The first 138 of the sync blocks 190 include MPEG encoded data, and the last 11 sync blocks include intermediate level parity information, known as $C_2$ parity. The $C_2$ parity stored in the last 11 sync blocks is used to error correct the contents of the preceding 138 sync blocks within the video area 186, thus providing an intermediate level of error correction which may correct errors affecting no more than approximately 10 kbytes of data.

Each sync block 190 includes, as further illustrated in FIG. 5, a number of fields for identifying the contents of the sync block. Specifically, the sync block begins with two bytes of a specific pattern, for synchronization. This pattern facilitates phase lock to the patterns of binary digits in the subsequent information, so that these digits may be reproduced upon playback. Following synchronization section 192 is an ID section 194 which contains a three byte binary number indicating the sequential number of the sync block. For example, the first sync block in video section 186 has an ID of 1, and the second sync block in video section 196 has an ID of 2, and so on. Following ID section 194 is a control header section 196 which is a one byte value used to identify the type of data in the sync block.

Sync blocks 190 may include MPEG data received directly from the digital data transmission, or may include MPEG-encoded trick play data as noted above. If the sync block includes normal MPEG data, the control header 196 includes a four-bit serial number in the second through fourth bits, and a binary "0" value in the seventh bit. However, if the sync block includes MPEG-encoded trick play data, the control header 196 includes, in addition to the four-bit serial number, a toggle bit in the fifth position which toggles from one to zero values (groups of tracks have, alternately, one or zero values in this bit—where the number of tracks in the group is equal to the minimum number of tracks crossed by the head during special effects playback), a new frame bit in the sixth position which identifies whether the trick play data is the first sync block in a new frame for display, and a bit in the eighth position which indicates the type of trick play data. Trick play data is also identified by a one bit binary value in the seventh position of the control header 196.

Under some circumstances, it may be necessary to insert "filler" sync blocks into video area 186, for example where the MPEG data is insufficient to fill a video section 186 on video tape 107. In such circumstances, filler sync blocks are added to video area 186 to fill out video area 186. Filler sync blocks are indicated by a "1" binary value in the first bit of the control header 186. As can be seen in FIG. 5, when a sync block contains complete MPEG data or MPEG-encoded trick play data, the first bit of control header 196 has a "0" value.

Following control header 196 is the data area 198 which includes 76 bytes of complete MPEG data or MPEG-encoded trick play data (or filler in the case of a filler sync block 190). Following the data area 198 is a parity area 200 which includes eight bytes of parity encoded from the preceding 82 bytes of data. This lowest level of parity encoding, known as $C_1$ parity, is used to correct small random errors which affect approximately 100 bytes of data.

As can be seen from FIG. 5, each sync block includes 90 bytes. Therefore, the video area 186 of a track 180 includes 13.41 kbytes of data. Thus, a track 180 includes roughly 15 kbytes of data, and ten tracks 180 include roughly 150 kbytes of data. As a result, to encode seven tracks using $C_3$ parity encoding, it is necessary to store and manipulate approximately 150 kbytes of data to perform $C_3$ encoding.

Referring now to FIGS. 6A–6E, the specific operations carried out in memories 156 and 158 during a record operation are depicted. The record operation uses both of memories 156 and 158 in a two-phase manner. In a first phase of operation, depicted in FIG. 6A, data from memories 116 and 124 is stored in memory 156 at a location 220. Meanwhile, previously error encoded data is read from memory 156 from an area 221. While these operations are being performed, memory 158, which contains previously stored data is encoded with $C_3$ parity information by error correction circuit 160.

Figures 6A, 6B, 6C:
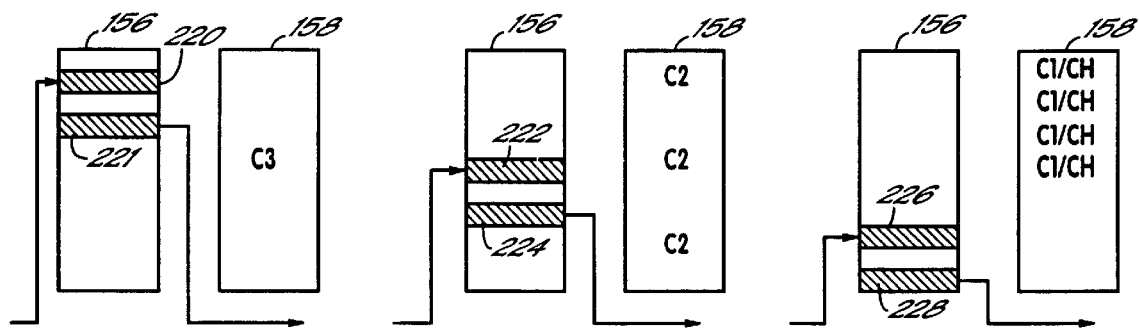
FIGS. 6A, 6B, 6C, 6D and 6E are illustrations of the utilization of memories 156 and 158 of FIG. 4 by the digital VCR during a record operation.

As time elapses, data continues to be written and read in sequential locations in memory 156 and error correction coding continues in memory 158. As illustrated in FIG. 6B, sometime after the operations illustrated in FIG. 6A, new complete MPEG and MPEG-encoded trick play data from memories 116 and 124 is being stored in an area 222 of memory 156. Meanwhile, previously error encoded data is read from an area 224 in memory 156.

It will be noted that incoming data from memories 116 and 124 has been sequentially written into each memory location preceding location 222, while at the same time, previously error encoded information has been sequentially read from each memory location preceding location 224. After a memory location in memory 156 has been read and the error encoded data stored therein has been forwarded to the recording head for recording on the video tape, new, unencoded data is written to this location. Thus, the location from which error encoded data is read, sequentially moves through memory 156 ahead of the location in which new data from memories 116 and 124 is written in memory 156.

As this reading and writing continues in memory 156, error correction circuit 160 continues to perform error correction in memory 158; thus, after completing $C_3$ encoding in memory 158, $C_2$ encoding is performed in memory 158. Memory 158 contains ten sequential tracks of digital data to be stored on video tape 107. Thus, as shown in FIG. 6A, $C_3$ encoding is performed across all tracks of information stored in memory 158. As illustrated in FIG. 6B, $C_2$ encoding is performed once for each track stored in memory 158 and therefore is performed ten times in memory 158. ($C_2$ encoding is performed on those tracks that will later contain $C_3$ data, as well as on those tracks that contain the MPEG data itself.)

After the time depicted in FIG. 6B, the operations being performed in memories 156 and 158 reach the state illustrated in FIG. 6C. As illustrated in FIG. 6C, new data from memories 116 and 124 is stored in an area 226 near to the end of memory 156, at the same time previously error encoded data is read out of the last entries of the memory 156 in an area 228. Meanwhile, in memory 158, error correction circuitry 160 has completed $C_2$ error encoding and has commenced $C_1$ error encoding and channel encoding.

Specifically, as noted above with respect to FIG. 5, each sync block 190 is encoded with $C_1$, parity information. Therefore, error correction circuit 160 performs $C_1$ parity encoding in each sync block stored in memory 158. Thus, $C_1$ encoding is performed by error correction circuit 160 one hundred and forty-nine times in memory 158, each operation operating on small blocks of 90 bytes of data.

As noted in the preceding paragraph, during this last encoding procedure performed in memory 158, channel encoding is also performed on the data in memory 158. Specifically, channel encoding circuit 164 operates upon data in memory 158 to encode this data for recording on video tape 107. The channel encoding scheme may be one of a number of suitable schemes for reducing noise in a digital recording on an analog medium such as video tape. One particularly suitable scheme is scrambled interleaved NRZI.

Figures 6D, 6E:
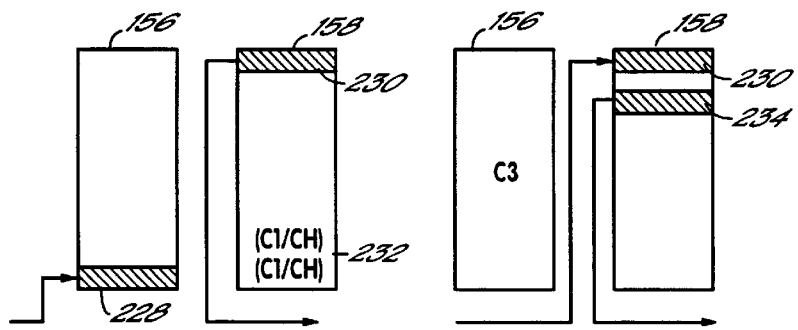

As illustrated in FIG. 6D, sometime after the operations illustrated in FIG. 6C, digital VCR has completed reading all of the previously encoded data stored in memory 156. At this point, the digital VCR begins reading the encoded data in memory 158 from an area 230 in memory 158. Meanwhile, new data from memories 116 and 124 continue to be written into memory 156 including into the last few entries 228 in memory 156.

At the time illustrated in FIG. 6D, error correction coding and channel encoding may be completed in memory 158; however, it is not necessary that all encoding be completed in memory 158 at this time. For example, $C_1$ encoding and channel encoding may be continuing in the last few entries 232 of memory 158 even as fully encoded entries are read entries 230 at the beginning of memory 158. All that is required is that $C_1$ and channel encoding are completed in a given entry in memory 158 before that entry is read for output to the recording head.

Indeed, in some embodiments of the present invention, it may be desirable, to conserve memory space and bandwidth, to perform $C_1$ encoding and channel encoding simultaneously with the operation of reading data for output to the head. In this embodiment, after $C_2$ encoding in memory 158, sync blocks of data are read sequentially from memory 158 and forwarded to error correction circuit 160 which performs $C_1$ encoding, and then to channel encoding circuit 164 for channel encoding. In this way, the fully encoded data need never be stored in memory 158, conserving memory space and bandwidth.

Referring now to FIG. 6E, at sometime after the time depicted in FIG. 6D, all entries in memory 156 have been written with new data from memories 116 and 124. Accordingly, the digital VCR begins writing new data from memories 116 and 124 into the initial entries 230 in memory 158. Meanwhile, the digital VCR continues reading error encoded information from memory 158 from location 234. At this time, all encoding has been completed in memory 158 and error correction circuit 160 begins encoding in memory 156, beginning with $C_3$ encoding, and progressing to $C_2$ and $C_1$ encoding.

Subsequent to the time illustrated by FIG. 6E, memories 156 and 158 are utilized by the digital VCR to store and retrieve data in the exact sequence illustrated in FIG. 6B, 6C and 6D, but with the roles of memories 156 and 158 reversed from those illustrated in the FIGS. Thus, the recording operation includes a first phase in which data is written to and read from memory 156 while encoding occurs in memory 158, and a second phase in which data is written to and read from memory 158, while encoding is performed in memory 156. There is also a transitional period, such as illustrated in FIG. 6D, during which data is written to one memory and read from the other memory.

Referring now to FIGS. 7A–7E, the playback operation performed by the digital VCR is a similar two phase operation. During a first phase of the playback operation, data obtained from the head reading video tape 107 is stored in memory 156, specifically in an area 220 of memory 156. At the same time, previously error corrected data in memory 156 is read from an area 221 and output to memories 116 and 124 for delivery to the signal destination, such as the television set. While data is being read to and written from memory 156, error correction operations are being performed in memory 158. Specifically, during the time period illustrated in FIG. 7A, $C_1$ error correction is being performed on data obtained during the previous phase from video tape 107 by the video tape head. As noted with respect to FIG. 6C, the $C_1$ error correction is performed on each of one hundred and forty-nine sync blocks and each of the ten tracks of data that have been read from video tape 107.

Alternatively, as noted above, $C_1$ error correction can be performed before incoming data from the heads are stored in a memory, i.e., data received from the heads via serial-to-parallel converters 172 may be immediately error-corrected in accordance with the $C_1$ error correction scheme. Then, $C_2$ and $C_3$ error correction are performed on the data stored in the memory. This approach eliminates the need to store $C_1$ parity bits in the main memory, and thus reduces the amount of memory required by the digital VCR, and reduces the memory bandwidth.

Figures 7A, 7B, 7C:
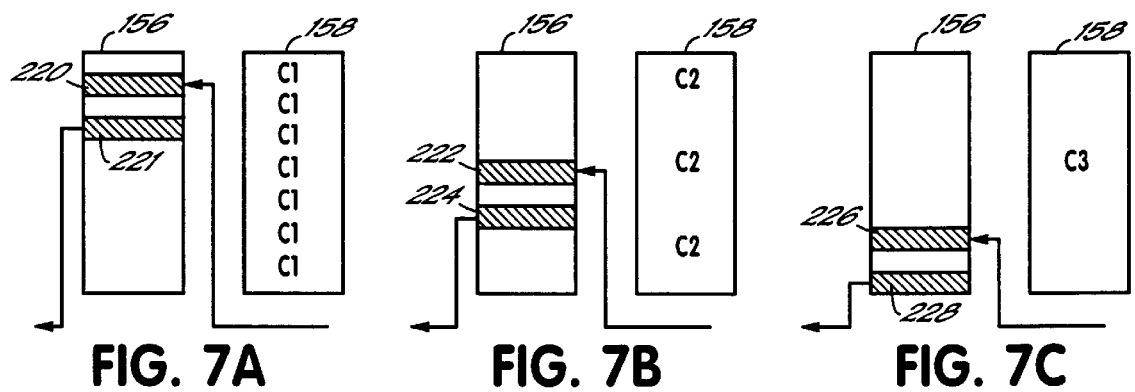
FIGS. 7A, 7B, 7C, 7D and 7E are illustrations of the utilization of memories 156 and 158 of FIG. 4 by the digital VCR during a playback operation.

Referring to FIG. 7B, sometime later, data being retrieved from the video tape head from video tape 107 is being stored in an area 222 in memory 156 while previously error corrected data continues to be read from memory 156 from an area 224. During this time period, $C_1$ error correction has been completed in memory 158, and error correction circuit 160 is performing $C_2$ error correction upon each of the seven tracks of data stored in memory 158.

Referring to FIG. 7C, sometime later, data continues to be written from video tape 107 to memory 156, specifically in an area 226. At the same time, previously error corrected data continues to be read from memory 156, at this time, from the last entries in area 228 in memory 156. Simultaneously, error correction circuit 160 has completed $C_2$ error correction of data stored in memory 158, and has commenced $C_3$ error correction of memory 158 using the three tracks of $C_3$ parity information read from video tape 107.

Figures 7D, 7E:
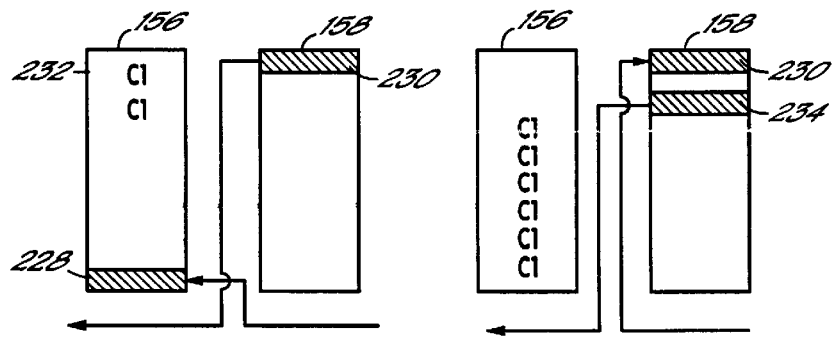

Referring to FIG. 7D, sometime after the operations discussed above, all of the error corrected data stored in memory 156 has been read and output to memories 116 and 124. At the same time, error correction circuit 160 has completed $C_3$ error correction of the memory 158. Thus, error corrected data is now available in memory 158. thus, at the time illustrated in FIG. 7D, the digital VCR begins reading error corrected data from memory 158, specifically from an area 230 near the beginning of memory 158. At the same time, uncorrected data read from video tape 107 is stored in memory 156 and specifically in an area 228 at the end of memory 156. As also seen in FIG. 7D, $C_1$ error correction may also begin in memory 156 at this time, specifically in an area 233 near to the beginning of memory 156. $C_1$ or $C_2$ error correction may be performed at this time, since both $C_1$ and $C_2$ parity encode subsets of the full 10 tracks of data encoded by $C_3$ parity.

Referring now to FIG. 7E, sometime later memory 156 has been completely filled with data from video tape 107; at this time, data being read from video tape 107 begins to be stored in memory 158, and specifically in an area 230 near the top of memory 158. Previously error corrected data continues to be read from memory 158, now from an area 234, and output to memories 116 and 124 for delivery to the signal destination.

Subsequent to the time illustrated in FIG. 7E, data continues to be written to and read from memory 158 while error correction procedures continue in memory 156. Thus, the operations performed in the two memories are exactly the same as the operations illustrated in 7B, 7C and 7D, but the roles of memories 156 and 158 are reversed.

Thus, the playback operation is also a two phase operation. During one phase, memory 156 is used for writing and reading data while memory 158 is used for error correction. During the second phase, the roles of these memories are reversed. There is also a transitional period, illustrated in FIG. 7D, in which data from the video tape 107 is written to one of the memories while at the same time previously error corrected data is read from the other of the two memories. During this transitional period, error correction may also be performed in the memory to which data is being written.

Figure 8A:
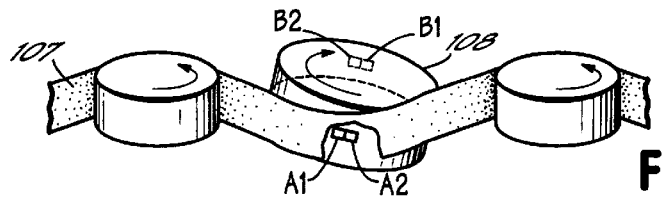
FIG. 8A is an illustration of an embodiment of the invention utilizing a rotating drum having two pairs of side-by-side, different-azimuth heads.

Referring now to FIG. 8A, drum 108 may include two pairs of recording and playback heads $A_1, A_2, B_1, B_2$ spaced 180° apart on the perimeter of drum 108. The heads in each pair have different azimuth angles, such that, for example, heads $A_1$, and $A_2$ have differing azimuth angles and $B_1$, and $B_2$ have differing azimuth angles. The azimuth angle of head $A_1$, is the same as the head $B_1$, and the azimuth angle of head $A_2$ is the same as the head $B_2$.

Data is recorded on video tape 107 through the combination of rotation of drum 108 and movement of video tape 107 across drum 108. As noted above, the result is tracks which follow an angular path across the width of tape 107.

Figure 8B:
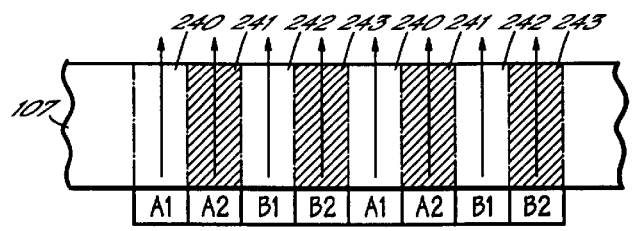
FIGS. 8B, 8C, 8D, 8E and 8F are diagrams of the tracks on the video tape and the paths followed by the heads of FIG. 8A under various playback conditions.

Referring to FIG. 8B, the paths 240, 241, 242, and 243 following by the respective heads, $A_1, A_2, B_1$, and $B_2$ can be illustrated diagrammatically, for illustrative purposes, as straight trajectories across the width of video tape 107. As seen in FIG. 8B, during maximum speed playback and record operations of the embodiment illustrated in FIG. 8A, heads $A_1$ and $A_2$ follow paths 240 and 241 across the width of video tape 107. Thereafter, heads $B_1$ and $B_2$ follow paths 242 and 243 across the width of video tape 107.

During maximum speed playback, the relationship between the rotation speed of drum 108 and the transport speed of video tape 107 is such that head $B_1$, follows a path 242 across tape 107 which is immediately adjacent to, but not overlapping with, the path 241 followed by the head $A_2$. Thus the paths traced by heads $A_1$, $A_2$, $B_1$, and $B_2$ are immediately adjacent, but not overlapping. As noted above, heads $A_1$, and $B_1$, have the same azimuth angles, heads $A_2$ and $B_2$ have the same azimuth angles, and the azimuth angles of $A_1$ and $B_1$ are opposite to the azimuth angles of heads $A_2$ and $B_2$. As a result of the differing azimuth angles of heads $A_1$, and $B_1$ as compared to heads $A_2$ and $B_2$, the paths 240, 241, 242 and 243 can be very closely spaced without interference therebetween.

Figure 8C:
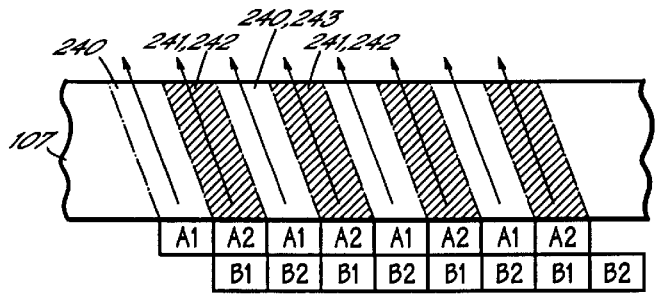

Referring now to FIG. 8C, the embodiment of the drum 108 shown in FIG. 8A can also be operated in a half speed mode. If the tape runs at half the speed illustrated in FIG. 8B, but the drum 108 rotates at the same speed, the heads $A_1$, $A_2$, $B_1$, and $B_2$ will follow different paths across the width of tape 107. Specifically, the paths of the heads crossing the tape 107 will have an tilted angle as compared to the paths illustrated in FIG. 8B. This tilted angle, diagrammatically illustrated in FIG. 8C, is the result of the slower tape speed combined with same head rotation speed.

Because the tape speed is one-half the tape speed discussed with reference to FIG. 8B, the paths 240 and 241 followed by heads $A_1$, and $A_2$ overlap with the paths 242 and 243 followed by heads $B_1$ and $B_2$. Specifically, the paths 240 traced by head $A_1$, coincide with the paths 243 traced by head $B_2$. At the same time, the paths 241 traced by head $A_2$ coincide with the paths 242 traced by head $B_1$. This coincidence of the paths of the heads is due to the fact that the tape 107 advances only half as far between each drum rotation as was the case in FIG. 8B. As a result, instead of having paths 240, 241, 242 and 243 directly adjacent, but not overlapping as shown in FIG. 8B, the paths overlap with each other as shown in FIG. 8C.

As can be seen by considering the head paths shown in FIG. 8C and the azimuth angles of the heads discussed above, it will be noted that recording on the video tape in half speed mode can be performed by only one of the pairs of the heads on drum 108. Thus, for example, heads $A_1$ and $A_2$ may be used to record information on tape 107, while heads $B_1$ and $B_2$ are not used. Alternatively, heads $B_1$, and $B_2$ may be used to record information on tape 107, in which case, heads $A_1$ and $A_2$ are not used. In either case, it will be noted that adjacent tracks recorded on tape 107 will have opposite azimuth angles. Specifically, because heads $A_1$, and $A_2$ have opposite azimuth angles, tracks recorded only using heads $A_1$, and $A_2$ will have alternating azimuth angles.

Figure 8D:
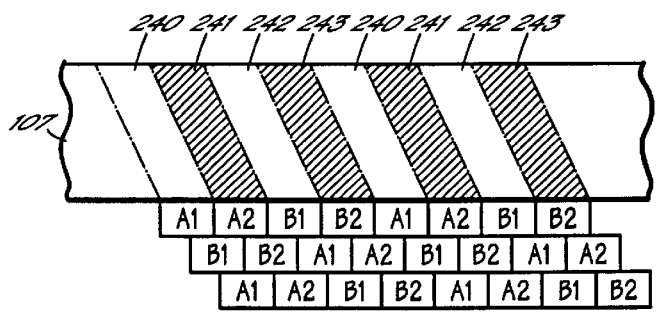

Referring now to FIG. 8D, a similar recording technique may be used in a one-third tape speed mode. As shown in FIG. 8D, when the tape 107 runs past drum 108 at one third of the maximum speed discussed above with reference to FIG. 8B, the paths traced by heads $A_1$, $A_2$, $B_1$, and $B_2$ have a further inclined angle relative to the paths traced when tape 107 is running at the maximum speed discussed above with reference to FIG. 8B. In this case, however, because the tape is running only at one third of the speed discussed above with reference to FIG. 8B, the paths taken by heads $A_1$, $A_2$, $B_1$ and $B_2$ across the tape overlap to a substantial extent. Specifically, after heads $A_1$, and $A_2$ trace paths 240 and 241 across the width of tape 107, heads $B_1$, and $B_2$ trace paths nearly overlapping the paths just traced by heads $A_1$, and $A_2$. Next, heads $A_1$, and $A_2$ trace paths in which head $A_1$ nearly overlaps the path earlier traced by path $A_2$. Only thereafter, after 1½ revolutions of drum 108, do heads $B_1$, and $B_2$ trace paths 242 and 243 which do not overlap the paths 240 and 241 traced by heads $A_1$, and $A_2$. Then, 1½ drum revolutions later, heads $A_1$, and $A_2$ trace paths 240 and 241 which do not overlap paths 242 and 243, and so on. Thus, when the tape 107 runs a one-third speed, it is possible to write data to tape 107 or read data from tape 107 by energizing alternate pairs of heads $A_1$ and $A_2$ or $B_1$, and $B_2$, every 1½ revolutions of drum 108.

In a similar fashion, tape 107 may be transported at 1/n speed and heads $A_1$, $A_2$, $B_1$ and $B_2$ may be used to record tracks across the width of tape 107 by energizing one pair of heads every n/2 revolutions of drum 108. Thus, the embodiment of drum 108 illustrated in FIG. 8A may be used to record on a video tape 107 at any integer fraction of the maximum recording speed illustrated in FIG. 8B.

Figure 8E:
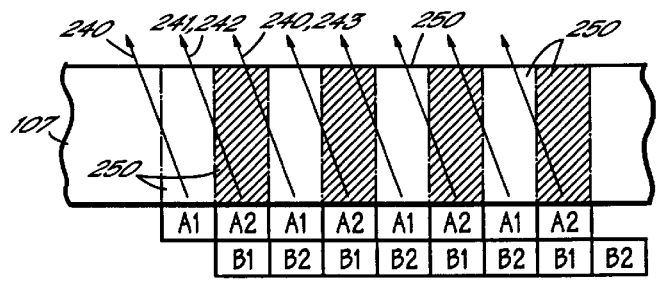

Referring now to FIG. 8E, it is also possible to play back a tape 107 recorded at the maximum speed (i.e. the illustrated in FIG. 8B) at a slower speed. Specifically, as shown in FIG. 8E, a tape 107 recorded at the maximum speed will have tracks 250 which are written across the width of tape 107 at an angle identical to that discussed above with reference to FIG. 8B. However, if this tape is played back at a speed of one-half the speed at which it was recorded, the paths 240, 241, 242 and 243 following by heads $A_1$, $A_2$, $B_1$, and $B_2$, respectively, will have an inclined angle relative to the angle of the tracks 250 written across the width of tape 107. Specifically, the paths taken by each of the heads will intersect two of the tracks written on tape 107. As a result, the data gathered from one head as it crosses tape 107 will contain only roughly one-half of the information contained on a track 250 on the tape 107.

As noted above, under such conditions, the complete contents of each track 250 on the tape may be reconstructed by combining information obtained from more than one of the heads. Specifically, as shown in FIG. 8E, a track 250 having a first azimuth angle, as indicated by the absence of shading, may be reconstructed from data gathered by heads $A_1$, and $B_1$, during one complete rotation of drum 108. Head $A_1$, will follow path 240 across tape 107 and provide information on the first one-half of the track 250, whereas head $B_1$, will cross the tape 107 following path 242 and will provide information from the second portion of the track 250. As noted above, these two partial track readings may be combined in an intermediate memory 174, or memories 156 and 158, as illustrated in FIG. 4 above. The partial track information can be easily combined by reference to the ID sections 194 of the sync blocks 190, as illustrated in FIG. 5. The ID section 194 provides an indication of the location of a sync block within a track 180. By referencing the ID sections of partial tracks read by each of the heads $A_1$, and $B_1$, these partial tracks can be combined to produce a complete track for error correction and output.

Figure 8F:
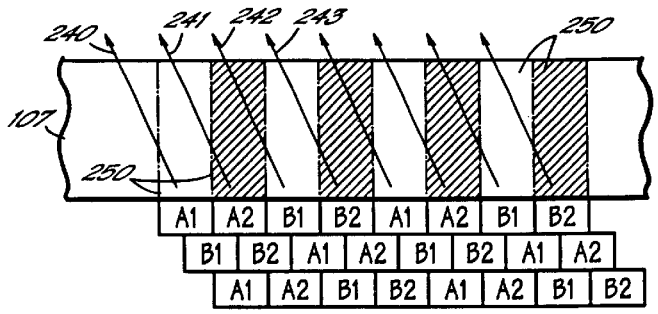

Referring now to FIG. 8F, it can be seen that tape 107 recorded at maximum speed may also be played back at a one-third speed. In such a case, during three sequential half-rotations of the drum 108, the data obtained by $A_1$, $B_1$, and $A_1$ will include only approximately one-third of the information on track 250 on tape 107. However, the information retrieved from the tape 107 during three consecutive half rotations of drum 108 is sufficient to reconstruct the entire the contents of each track 250. Thus, the data from a track 250 having the first azimuth angle referred to above may be reconstructed by combining the data obtained from head $A_1$, during a first half rotation of drum 108 (which will include roughly the first one-third of the track), with the data from head $B_1$, during a second half rotation of drum 108 (which will include roughly the middle one-third of the track) and the data obtained from head $A_1$, during a third half rotation of drum 108 (which will include roughly the last one-third of the track).

Thus, in general, tracks 250 on tape 107 may be reconstructed while tape is playing at 1/n of the maximum speed discussed above with reference to FIG. 8B, by combining the data obtained from a pair $A_1$, and $B_1$, or $A_2$ and $B_2$ of heads during n/2 consecutive rotations of drum 108.

Further details on reconstruction of data from a prerecorded track through multiple rotations of a drum 108 can be found, e.g. in U.S. Pat. No. 4,829,387 of Kato et al., issued May 9, 1989.

Figure 9A:
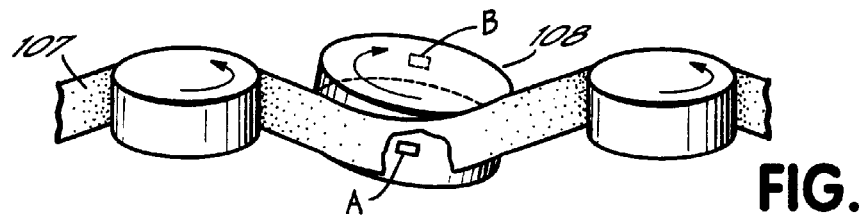
FIG. 9A is an illustration of an embodiment of the invention utilizing a rotating drum having two different-azimuth heads.
Figure 9B:
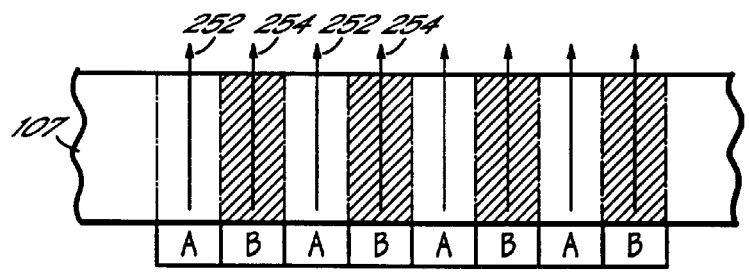
FIGS. 9B, 9C and 9D are diagrams of the tracks on the video tape and the paths followed by the heads of FIG. 9A under various playback conditions.

Referring now to FIG. 9A, in a second embodiment of the present invention, drum 108 supports two heads A and B at positions 180° separated on drum 108. Heads A and B have opposite azimuth angles. As seen in FIG. 9b, as a result when heads A and B trace paths 252 and 254 across the width of tape 107, these paths are directly adjacent to each other and have opposite azimuth angles to maximize the isolation between the tracks. (In such an embodiment, the tape speed, and the data rate at which information can be recorded on tape 107, are one-half of the tape speed and data rate which can be obtained in the embodiment shown in FIG. 8B, for a given rotation speed of head 108.)

Figure 9C:
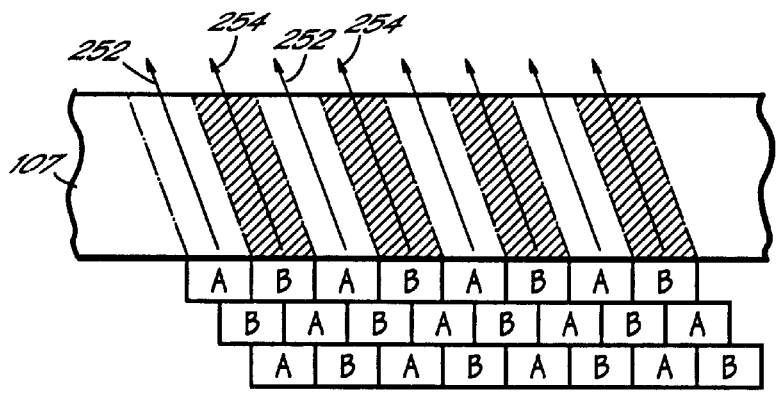

Referring to FIG. 9C, it can be seen that in this embodiment, tape speed may also be reduced to one-third the tape speed discussed above with reference to FIG. 9B. In this situation, adjacent tracks may be written by alternating heads A and B every 1½ rotations of drum 108. Thus, the usage of heads A and B is similar to that in the example of FIG. 8D.

Figure 9D:
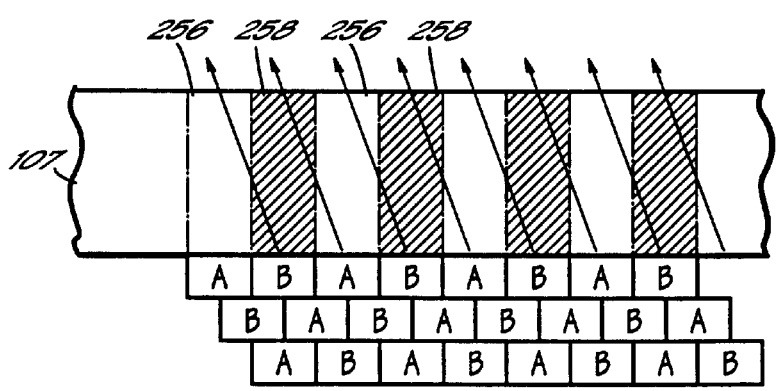

Referring to FIG. 9D, it can also be seen that a tape 107 containing data recorded at maximum speed can be reconstructed at a slower speed by combining data obtained during multiple rotations of drum 108. Specifically, in FIG. 9D, it can be seen that the data in a track 256 may be reconstructed from data obtained from the A head during 1½ rotations of drum 108. Then, the contents of a track 258 may be reconstructed from data obtained from the B head during the following 1½ rotations of drum 108. Generally, data recorded at maximum speed can be reconstructed at a speed of 1/n the maximum speed where n is an odd integer, by combining data obtained during n/2 rotations of drum 108.

Referring now to FIG. 10, the relative timing of the record and playback operations, and the relationships between the use of memories 156 and 158 to the rotations of the drum 108, can be better understood when depicted in tabular form. Specifically, the table in FIG. 10 identifies the playback and record process and the operations performed in each of memories 156 and 158 during a fixed number of rotations of the drum 108 as it writes data to or reads data from tape 107. The table in FIG. 10 assumes that the embodiment of drum 108 illustrated in FIG. 8A is being used.

Thus, during a maximum speed record operation 260, during the first five drum rotations 262, memory 156 is used to store data from the incoming transmission and also to retrieve previously error encoded data for output to the heads for recording on tape. At the same time, memory 158 is used for error encoding of previously stored data from the incoming transmission and also for initial retrieval of encoded data for heads A and B. During the next five drum rotations 264, the roles of the memories reverse; memory 156 is used for error encoding previously stored data (and, during the transition period, for initial retrieval of error encoded data for the heads), while memory 158 is used for storage of data from the incoming transmission and retrieval of the previously encoded data for output to the heads. During the following periods 266, 268 the roles of the memories reverse again.

Similarly, in a maximum speed playback operation 270, for the first five drum rotations 262, data is stored in memory 156 as it is obtained from the heads, and error corrected data is retrieved for output. At the same time, during these five drum rotations, error correction is performed in memory 158 (and thereafter, during the transition period, error corrected data is retrieved from memory 158). For the next five drum rotations, 264, the roles of the memory reverse; memory 156 is used for error correction and initial retrieval of data for output whereas memory 158 is used to store incoming data from the heads and to continue retrieval of correct error corrected data for output. In the subsequent five drum rotations 266, memories 156 and 158 revert to their original roles; memory 156 is used to store data from heads and to retrieve corrected data for output where memory 158 is used for error correction of previously stored data and initial retrieval for output.

One-half speed recording 280 is identical to maximum speed recording 260 with the exception that the roles of memories 156 and 158 reverse every ten drum rotations, rather than every five drum rotations. Thus, during the first ten drum rotations 262, 264, memory 156 stores data from the incoming transmission and also retrieves encoded data for output to the heads, whereas memory 158 is used for error encoding previously stored data (and during the transition period for retrieval of data for the heads). The roles reverse for the next ten drum rotations 266, 268.

A second important difference, discussed above, is that error encoded data which is retrieved and sent to the heads for recording on tape 107 are sent only to heads $A_1$, and $A_2$ and not to heads $B_1$, and $B_2$. Thus during one-half speed recording, heads $B_1$, and $B_2$ are not used.

One-half speed playback 290 is similarly identical to maximum speed playback 270 with the exception that ten head rotations are needed for operations that take only five drum rotations in maximum speed playback 270. Thus, during the first ten drum rotations 262, 264, memory 156 stores data incoming from the heads and is also used to retrieve previously error corrected data for output. At the same time, memory 158 is used to error correct previously stored data from the heads and for initial retrieval of error corrected data for output. These roles reverse during the next ten drum rotations 266, 268.

A second difference between one-half speed playback 290 and maximum speed playback 270 is that data is obtained only from heads $A_1$ and $A_2$ and not from both heads $A_1$, $A_2$, $B_1$ and $B_2$. Thus, during one-half speed playback, heads $B_1$, and B2 are inactive.

As discussed above, it is also possible to record at slower speeds, for example, one-third speed 300, or one-quarter speed 310. As can be seen in FIG. 10, when recording at one-third speed memories 156 and 158 exchange roles every fifteen drum rotations rather than every five drum rotations as in maximum speed recording. Furthermore, during one-third speed recording, data is output to alternating pairs $A_1/A_2$ or $B_1/B_2$ of heads as discussed above with reference to FIG. 8D. During one-quarter speed recording 310, twenty drum rotations occur between each exchange of roles by memories 156 and 158. Furthermore, data transmitted to the heads for recording is transmitted only to heads $A_1$ and $A_2$, only every other drum rotation.

As noted above, a tape 107 recorded at maximum speed can be played back at slow speed. Slow speed playback 320 involves a similar process to the process used during maximum speed playback 270. However, there are a few important differences, first, in the case of half-speed playback, memories 156 and 158 exchange roles every ten drum rotations, rather than every five rotations. Furthermore, as noted above with reference to FIGS. 8E and 8F, tracks are reconstructed from data obtained from multiple passes of heads $A_1$, $A_2$ and $B_1$, $B_2$ across one track recorded on the tape 107. As a result, a separate reconstruction step is performed using intermediate memory 174 during reduced-speed playback.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. Apparatus for recording a digital signal and redundancy signals such that said digital signal may be reproduced by error correcting the recorded digital signal using the redundancy signals, comprising a digital memory, a digital storage system providing recordation of digital information, error correcting circuitry receiving a group of digital signals and generating therefrom redundancy signals to be used in error correction of said digital signals, and control circuitry controlling operations of said memory, said digital storage system and said error correcting circuitry to receive digital signals from a signal source, error-encode and record the error-encoded digital signals, wherein said control circuitry, in a first phase of a recording operation performed during a first period of time, causes a first error-encoded digital signal in a first portion of said memory to be forwarded to said digital storage system for recordation, and causes digital signals from said signal source to be stored in place of said first error-encoded digital signal, while simultaneously causing said error correcting circuitry to error-encode digital signals stored in a second portion of said digital memory to form an error-encoded result and store said error-encoded result into said second portion of said digital memory, said control circuitry, in a second phase of said recording operation performed during a second period of time, causes a second error-encoded digital signal in the second portion of said memory to be forwarded to said digital storage system for recordation, and causes digital signals from said signal source to be stored in place of said second error-encoded digital signal, while simultaneously causing said error correcting circuitry to error encode digital signals stored in the first portion of said digital memory to form an error-encoded result and store said error-encoded result into said first portion of said digital memory, and said control circuitry alternately performs said first and second phases of said recording operation such that said first period of time and said second period of time are nonoverlapping.

2. The recording apparatus of claim 1 wherein, during a period of transition from said first phase of said recording operation to said second phase of said recording operation, said control circuitry causes an error-encoded digital signal in the second portion of said memory to be forwarded to said digital storage system for recordation, while simultaneously causing a digital signal from said signal source to be stored in said first portion of said digital memory, and during a period of transition from said second phase of said recording operation to said first phase of said recording operation, said control circuitry causes an error-encoded digital signal in the first portion of said memory to be forwarded to said digital storage system for recordation, while simultaneously causing a digital signal from said signal source to be stored in said second portion of said digital memory.

3. The recording apparatus of claim 2 wherein said control circuitry initiates said transition period from said first phase to said second phase after said error correcting circuitry completes error encoding digital signals stored in said second portion of said digital memory, and said control circuitry initiates said transition period from said second phase to said first phase after said error correcting circuitry completes error encoding digital signals stored in said first portion of said digital memory.

4. The recording apparatus of claim 1 further comprising a channel encoding circuit for encoding a digital signal for recordation by said digital storage system, wherein said control circuitry causes said channel encoding circuit to channel encode error encoded digital signals stored in said digital memory prior to forwarding said error encoded digital signals to said digital storage system for recordation.

5. The recording apparatus of claim 1 adapted for use with a signal source which produces a digital video signal including data representing complete still images and data representing incremental modifications of the still images to produce motion, further comprising a trick play processor detecting said data representing complete still images, and generating compressed representations of said complete still images for recording by said digital storage system, wherein said control circuitry causes said compressed representations generated by said trick play processor to be stored in said memory, in an interleaved manner, with said digital video signal from said signal source, such that both said compressed representations and said digital video signal are error encoded and recorded by said digital storage system.

6. The recording apparatus of claim 5 further comprising a packet encoder for encoding said compressed representations produced by said trick play processor into a format compatible with said digital video signal.

7. The recording apparatus of claim 1 adapted for use with a digital video signal transmitted in a digital video broadcast for display on a video display, further comprising a packet detector for identifying video and audio information in a digital video broadcast and for supplying said video and audio information to said memory under control of said control circuitry.

8. The recording apparatus of claim 1 adapted to include a playback function for providing previously recorded digital information to a playback destination, wherein said digital storage system also provides reproduction of previously recorded digital information, said error correcting circuitry also error corrects a group of digital signals in response to redundancy signals appended thereto under control of said control circuitry, said control circuitry, in a first phase of a playback operation performed during a third period of time, causes a first error-corrected digital signal in the first portion of said memory to be forwarded to a signal destination, and causes digital signals reproduced by said digital storage system to be stored in place of said first error-corrected digital signal, while simultaneously causing said error correcting circuitry to error correct digital signals stored in the second portion of said digital memory and store an error-corrected result in said second portion of said digital memory, and said control circuitry, in a second phase of said playback operation performed during a fourth period of time, causes a second error-corrected digital signal in the second portion of said memory to be forwarded to said signal destination, and causes digital signals reproduced by said digital storage system to be stored in place of said second error-corrected digital signal, while simultaneously causing said error correcting circuitry to error correct digital signals stored in the first portion of said digital memory and store an error-corrected result in said first portion of said digital memory, and said control circuitry alternately performs said first and second phases of said playback operation such that said third period of time and said fourth period of time are nonoverlapping.

9. Apparatus for reproducing a digital signal recorded with redundancy signals by error correcting the recorded digital signal using the redundancy signals, comprising a digital memory, a digital storage system providing reproduction of recorded digital information, error correcting circuitry for error correcting a group of digital signals in response to redundancy signals appended thereto, and control circuitry for controlling operations of said memory, said digital storage system and said error correcting circuitry to play back and error-correct digital signals, and forward error-corrected digital signals to a signal destination, wherein said control circuitry, in a first phase of a playback operation performed during a first period of time, causes a first error-corrected digital signal in a first portion of said memory to be forwarded to said signal destination, and causes digital signals reproduced by said digital storage system to be stored in place of said first error-corrected digital signal while simultaneously causing said error correcting circuitry to error correct digital signals stored in a second portion of said digital memory to form an error-corrected result and store said error-corrected result in said second portion of said digital memory, said control circuitry, in a second phase of said playback operation performed during a second period of time, causes a second error-corrected digital signal in the second portion of said memory to be forwarded to said signal destination, and causes digital signals reproduced by said digital storage system to be stored in place of said second error-corrected digital signal, while simultaneously causing said error correcting circuitry to error correct digital signals stored in the first portion of said digital memory to form an error-corrected result and store said error-corrected result in said first portion of said digital memory, and said control circuitry alternately performs said first and second phases of said playback operation such that said first period of time and said second period of time are nonoverlapping.

10. The reproducing apparatus of claim 9 wherein, during a period of transition from said first phase of said playback operation to said second phase of said playback operation, said control circuitry causes an error-corrected digital signal in the second portion of said memory to be forwarded to said signal destination, while simultaneously causing a digital signal reproduced by said digital storage system to be stored in said first portion of said digital memory, and during a period of transition from said second phase of said playback operation to said first phase of said playback operation, said control circuitry causes an error-corrected digital signal in the first portion of said memory to be forwarded to said signal destination, while simultaneously causing a digital signal reproduced by said digital storage system to be stored in said second portion of said digital memory.

11. The reproducing apparatus of claim 10 wherein said control circuitry initiates said transition period from said first phase to said second phase after said error correcting circuitry completes error correcting digital signals stored in said second portion of said digital memory, and said control circuitry initiates said transition period from said second phase to said first phase after said error correcting circuitry completes error correcting digital signals stored in said first portion of said digital memory.

12. The reproducing apparatus of claim 9 adapted for use with a digital video signal transmitted in a digital video broadcast for display on a video display, said digital video signal including an error section for indicating a transmission error in said digital video signal, wherein said error correcting circuitry generates an error signal when an uncorrectable error is detected in a digital signal and redundancy information reproduced by said digital storage system, further comprising an error encoder responsive to an error signal from said error correcting circuitry to modify said error section of said digital video signal reproduced by said digital storage system to indicate the presence of an error in said digital video signal, and wherein said control circuitry causes said digital video signal to be forwarded to said signal destination through said error encoder.

13. The reproducing apparatus of claim 9 adapted for playback of a signal at a slower rate than the rate at which said signal was recorded, wherein said digital storage system is a video tape drive for passing a magnetic tape past a rotating drum bearing a magnetic head to read magnetic tracks recorded across said tape, wherein said control circuitry plays back a tape at a slower rate than the rate at which said tape was recorded by causing said tape drive to pass said tape past said rotating magnetic head at a rate slower than was used when said tape was recorded, while causing said drum to rotate at the same rate as was used when said tape was recorded, such that said magnetic head passes through each track recorded on said tape during more than one rotation of said drum, further comprising reconstruction circuitry for combining information obtained from each track during multiple rotations of said head to reconstruct a complete version of each track for storage in said memory.

14. The reproducing apparatus of claim 13 wherein said reconstruction circuitry comprises an intermediate memory for storing information obtained from a track by said head during rotations of said head.

15. The reproducing apparatus of claim 13 wherein said reconstruction circuitry causes incomplete versions of a track obtained during rotation of said head to be stored in said memory, said incomplete versions being overlapped to form a complete version of said track in said memory.

16. The reproducing apparatus of claim 9 adapted for playback of a signal at a slower rate than the rate at which said signal was recorded, wherein said digital storage system is a video tape drive for passing a magnetic tape past a rotating drum bearing magnetic heads to read magnetic tracks recorded across said tape, said drum bearing two heads on opposite sides of drum, wherein said control circuitry plays back said tape at a slower rate than the rate at which said tape was recorded by causing said tape drive to pass said tape past said rotating magnetic head at a rate slower than was used when said tape was recorded, while causing said drum to rotate at the same rate as was used when said tape was recorded, such that said magnetic heads pass through each track recorded on said tape during at least one rotation of said drum, further comprising reconstruction circuitry for combining information obtained from each track by both of said magnetic heads to reconstruct a complete version of each track for storage in said memory.

17. The reproducing apparatus of claim 16 wherein said reconstruction circuitry comprises an intermediate memory for storing information obtained from a track by both heads during at least one rotation of said drum.

18. The reproducing apparatus of claim 16 wherein said reconstruction circuitry causes incomplete versions of a track obtained during rotation of said heads to be stored in said memory, said incomplete versions being overlapped to form a complete version of said track in said memory.

19. The apparatus of claim 1 or 9 wherein said error correcting circuitry uses three levels of parity encoding, a third parity encoding scheme being used upon an entire group of digital signals, a second parity encoding scheme being used upon sub-groups of said group of digital signals, and a first parity encoding scheme being used upon sub-sub-groups of said sub-groups of digital signals.

20. The apparatus of claim 1 or 9 wherein said digital storage system is a video tape drive for passing a magnetic tape past a rotating drum bearing at least one magnetic head.

21. The apparatus of claim 20 wherein said rotating drum bears two magnetic heads at different azimuth angles on opposite sides of said drum.

22. The apparatus of claim 20 wherein said rotating drum bears two pairs of magnetic heads on opposite sides of said drum, the heads in each pair having different azimuth angles.

23. The apparatus of claim 1 or 9 wherein said digital storage system is a video disk drive for rotating a magneto-optical disk under a magnetic/optical head.

24. The apparatus of claim 1 or 9 wherein said digital memory is included in a single integrated circuit and said portions are pages in said single integrated circuit.

25. A method for recording a digital signal from a signal source in a digital storage system along with redundancy signals such that said digital signal may be reproduced by error correcting the recorded digital signal using the redundancy signals, comprising a first phase performed during a first period of time comprising the steps of forwarding an error-encoded digital signal from a first portion of a digital memory to said digital storage system for recordation, and storing digital signals from said signal source in said first portion of said digital memory, while simultaneously error-encoding digital signals stored in a second portion of said digital memory to form an error-encoded digital result signal and storing said error-encoded result signal in said second portion, a second phase performed during a second period of time comprising the steps of forwarding the error-encoded digital signal in said second portion of said memory to said digital storage system for recordation, and storing digital signals from said signal source in said second portion of said digital memory, while simultaneously error-encoding digital signals stored in said first portion of said digital memory to form an error-encoded digital result signal and storing said error-encoded result signal in said first portion, wherein said first and second phases are alternately repeated such that said first period of time and said second period of time are nonoverlapping.

26. The recording method of claim 25 further comprising a period of transition from said first phase to said second phase comprising the steps of forwarding an error-encoded digital signal in the second portion of said memory to said digital storage system for recordation, while simultaneously storing digital signals from said signal source in said first portion of said digital memory, and a period of transition from said second phase to said first phase comprising the steps of forwarding an error-encoded digital signal in the first portion of said memory to said digital storage system for recordation, while simultaneously storing digital signals from said signal source in said second portion of said digital memory.

27. The recording method of claim 26 wherein said transition period from said first phase to said second phase is performed after error encoding of digital signals stored in said second portion of said digital memory, and said transition period from said second phase to said first phase is performed after error encoding of digital signals stored in said first portion of said digital memory.

28. The recording method of claim 25 wherein said phases further comprise channel encoding error encoded digital signals stored in said digital memory, for recordation by said digital storage system, prior to forwarding said error r encoded digital signals to said digital storage system for recordation.

29. The recording method of claim 25 adapted for recording a digital video signal including data representing complete still images and data representing incremental modifications of the still images to produce motion, further comprising generating compressed representations of said complete still images, and stored said compressed representations in said memory, in an interleaved manner, with said digital video signal, such that both said compressed representations and said digital video signal are error encoded and recorded by said digital storage system.

30. The recording method of claim 29 further comprising encoding said compressed representations into a format compatible with said digital video signal.

31. A method for reproducing a digital signal recorded in a digital storage system along with redundancy signals by error correcting the recorded digital signal using the redundancy signals, comprising a first phase performed during a first period of time comprising the steps of forwarding an error-corrected digital signal in a first portion of a digital memory to a signal destination, and storing digital signals reproduced by said digital storage system in said first portion of said digital memory, while simultaneously error-correcting digital signals stored in a second portion of said digital memory to form an error-corrected digital result signal and store said error-corrected result signal in said second portion, a second phase performed during a second period of time comprising the steps of forwarding the error-corrected digital signal in said second portion of said digital memory to said signal destination, and storing digital signals reproduced by said digital storage system in said second portion of said digital memory, while simultaneously error-correcting digital signals stored in said first portion of said digital memory to form an error-corrected digital result signal and store said error-corrected result signal in said first portion, wherein said first and second phases are alternately repeated such that said first period of time and said second period of time are nonoverlapping.

32. The reproducing method of claim 31 further comprising a period of transition from said first phase to said second phase comprising the steps of forwarding an error-corrected digital signal in said second portion of said memory to said signal destination, while simultaneously storing digital signals reproduced by said digital storage system in said first portion of said digital memory, and a period of transition from said second phase to said first phase comprising the steps of forwarding an error-corrected digital signal in said first portion of said memory to said signal destination, while simultaneously storing digital signals reproduced by said digital storage system in said second portion of said digital memory.

33. The reproducing method of claim 32 wherein said transition period from said first phase to said second phase is performed after error correcting of digital signals stored in said second portion of said digital memory, and said transition period from said second phase to said first phase is performed after error correcting of digital signals stored in said first portion of said digital memory.

34. The reproducing method of claim 31 adapted for reproducing a digital video signal transmitted in a digital video broadcast for display on a video display, said digital video signal including an error section for indicating a transmission error in said digital video signal, further comprising modify said error section of said digital video signal reproduced by said digital storage system to indicate the presence of an error in said digital video signal whenever an uncorrectable error is detected during error correction of a digital signal reproduced by said digital storage system.

35. The reproducing method of claim 31 adapted for playback of a signal at a slower rate than the rate at which said signal was recorded, wherein said digital storage system is a video tape drive for passing a magnetic tape past a rotating drum bearing a magnetic head to read magnetic tracks recorded across said tape, further comprising playing back a tape at a slower rate than the rate at which said tape was recorded by causing said tape drive to pass said tape past said rotating magnetic head at a rate slower than was used when said tape was recorded, while causing said drum to rotate at the same rate as was used when said tape was recorded, such that said magnetic head passes through each track recorded on said tape during more than one rotation of said drum, and combining information obtained from each track during multiple rotations of said head to reconstruct a complete version of each track for storage in said memory.

36. The reproducing method of claim 35 wherein said combining step is performed in an intermediate memory.

37. The reproducing method of claim 35 wherein said combining step comprises storing incomplete versions of a track obtained during rotation of said head in said digital memory, and overlapping said incomplete versions in said digital memory to form a complete version of said track in said memory.

38. The reproducing method of claim 31 adapted for playback of a signal at a slower rate than the rate at which said signal was recorded, wherein said digital storage system is a video tape drive for passing a magnetic tape past a rotating drum bearing magnetic heads to read magnetic tracks recorded across said tape, said drum bearing two heads on opposite sides of drum, further comprising playing back said tape at a slower rate than the rate at which said tape was recorded by causing said tape drive to pass said tape past said rotating magnetic head at a rate slower than was used when said tape was recorded, while causing said drum to rotate at the same rate as was used when said tape was recorded, such that said magnetic heads pass through each track recorded on said tape during at least one rotation of said drum, combining information obtained from each track during multiple rotations of said head to reconstruct a complete version of each track for storage in said memory.

39. The reproducing method of claim 38 wherein said combining step is performed in an intermediate memory by storing information obtained from a track by both heads during at least one rotation of said drum.

40. The reproducing method of claim 38 wherein said combining step comprises storing incomplete versions of a track obtained during rotation of said heads in said digital memory, and overlapping said incomplete versions in said digital memory to form a complete version of said track in said memory.

41. The method of claim 25 or 31 wherein said method uses three levels of parity encoding, a third parity encoding scheme being used upon an entire group of digital signals, a second parity encoding scheme being used upon sub-groups of said group of digital signals, and a first parity encoding scheme being used upon sub-sub-groups of said sub-groups of digital signals.

42. The method of claim 25 or 31 wherein said digital storage system is a video tape drive for passing a magnetic tape past a rotating drum bearing at least one magnetic head.

43. The method of claim 42 wherein said rotating drum bears two magnetic heads at different azimuth angles on opposite sides of said drum.

44. The method of claim 42 wherein said rotating drum bears two pairs of magnetic heads on opposite sides of said drum, the heads in each pair having different azimuth angles.

45. The method of claim 25 or 31 wherein said digital storage system is a video disk drive for rotating a magneto-optical disk under a magnetic/optical head.

46. The method of claim 25 or 31 wherein said digital memory is a single integrated circuit and said portions are pages in said single integrated circuit.

* * * * *

UNITED STATES PATENT AND TRADEMARK OFFICE
CERTIFICATE OF CORRECTION

PATENT NO. : 6,438,319 B1
DATED : August 20, 2002
INVENTOR(S) : Inoue et al.

It is certified that error appears in the above-identified patent and that said Letters Patent is hereby corrected as shown below:

Column 1,
Line 19, reads "RELATED APPLICATION" this should be deleted.

Column 2,
Line 17, reads "specifically" and should read -- Specifically --.

Column 6,
Line 25, reads "110a" and should read -- 101 a --.
Lines 28 and 29, read "U.S. patent. application" and should read -- U.S. patent application --.

Column 10,
Line 30, reads "$C_1$," and should read -- $C_1$ --.

Column 12,
Lines 57 and 59, should not have commas after $B_1$ and $A_1$.

Column 13,
Lines 9, 14, 18, 34, 36, 51, 55, and 57, should not have commas after $A_1$ and $B_1$.

Column 14,
Lines 2, 3, 4, 5, 7, 9, 10, 14, 45, 46, 48, 57, and 58, should have commas after $A_1$ and $B_1$.

Column 15,
Lines 4, 6, 8, and 14, should not have commas after $A_1$ and $B_1$.

Column 16,
Lines 41, 42, 43, and 58, should not have commas after $A_1$ and $B_1$.

Column 17,
Line 56, reads "error-encode" and should read -- error encode --.

Column 19,
Line 50, "error correcting circuitry for" should start a new paragraph.
Line 64, reads "digital signal while" and should read -- digital signal, while --.

UNITED STATES PATENT AND TRADEMARK OFFICE
CERTIFICATE OF CORRECTION

PATENT NO.    : 6,438,319 B1
DATED         : August 20, 2002
INVENTOR(S)   : Inoue et al.

It is certified that error appears in the above-identified patent and that said Letters Patent is hereby corrected as shown below:

Column 22,
Lines 34-41, are incorrectly indented. Paragraphs should be indented as follows:
-- ...digital signals stored in said first portion of said digital memory to form an error-encoded digital result signal and storing said error-encoded result signal in said fist portion, wherein
      said first and second phases are alternatively... --

Column 23,
Line 3, reads "said error r encoded" and should read -- said error encoded --.
Line 45, "said first and second phases" should be indented.
Line 56, "a period of transition" should begin new paragraph.

Signed and Sealed this

Thirteenth Day of July, 2004

JON W. DUDAS
*Acting Director of the United States Patent and Trademark Office*